United States Patent [19]

Leclercq

[11] Patent Number: 4,844,861
[45] Date of Patent: Jul. 4, 1989

[54] FUEL ASSEMBLY FOR NUCLEAR REACTORS

[75] Inventor: Joseph Leclercq, Saint Didier Au Mont D'Or, France

[73] Assignee: Fragema, Courbevoie, France

[21] Appl. No.: 805,521

[22] Filed: Dec. 6, 1985

[30] Foreign Application Priority Data

Dec. 6, 1984 [FR] France .................................. 84 18645

[51] Int. Cl.⁴ ............................................... G21C 3/34
[52] U.S. Cl. ..................................... 376/439; 376/440; 376/442; 376/462; 376/438
[58] Field of Search ............... 376/442, 439, 438, 443, 376/440, 434, 462

[56] References Cited

U.S. PATENT DOCUMENTS

| | | | |
|---|---|---|---|
| 3,862,000 | 1/1975 | Pugh et al. ........................... | 376/439 |
| 3,984,284 | 10/1976 | Lone et al. .......................... | 376/442 |
| 4,081,324 | 3/1978 | Flora et al. ......................... | 376/442 X |
| 4,427,624 | 1/1984 | Marlatt et al. ..................... | 376/446 X |
| 4,522,782 | 6/1985 | Leclercq ............................. | 376/438 |
| 4,576,786 | 3/1986 | DeMario ............................. | 376/439 |

FOREIGN PATENT DOCUMENTS 1422213 11/1965 France ................................. 376/443

OTHER PUBLICATIONS

Dehon, C et al., "Fragema Offers an Advanced Assembly", N.E.I., Sep. 1985, pp. 42-45.
Orr, W. L. et al, "Westinghouse Introduces New Fuel for Pwrs and Bwrs", NEI, Sep. 1985, pp. 53-55.

Primary Examiner—John S. Maples
Attorney, Agent, or Firm—Pollock, Vande Sande & Priddy

[57] ABSTRACT

A fuel assembly for nuclear reactors comprising a skeleton having two end pieces connected together by elongate elements and several grids spaced apart along the guide tubes and forming cells for holding a bundle of fuel elements in position at the nodes of a regular lattice. The grids comprise median grids adapted for resisting lateral shocks and having fins for creating turbulences in the flow of the coolant along the assembly, bottom grids without fins and ensuring the cross bracing of the elements and top grids with fins and ensuring cross bracing of the elements, the top and bottom grids imposing on the coolant a pressure loss lower than the median grids.

12 Claims, 8 Drawing Sheets

FUEL ASSEMBLY FOR NUCLEAR REACTORS

BACKGROUND OF THE INVENTION

1. Field of the Invention

The invention relates to fuel assemblies for nuclear reactors of the type comprising a skeleton having two end pieces connected together by elongate elements such as guide tubes and grids spaced apart along the guide tubes and forming cells for holding a bundle of fuel elements in position at the nodes of a regular lattice. It is particularly suitable for use in spectral shift light water reactors in which the initial reactivity excess is compensated by undermoderating the reactor and hardening the neutron energy spectrum. An increase fraction of the neutrons is then absorbed by fertile material. In such a reactor, it is possible to increase the moderation rate for a predetermined fuel burn-up by removing rods which contain neutron transparent or fertile material (depleted uranium, for example) from guide tubes which are then invaded by water.

2. Prior Art

In fuel assemblies of the above-defined type, the grids fulfill a number of separate functions. They guide and support the fuel elements containing fissile material. They provide resistance to transverse shocks which the assemblies may undergo during handling, accidents and, possibly, seisms. In most cases, the grids cause turbulence in the coolant flow and deflect coolant streams within the assembly to homogenize the temperature and avoid the formation of hot spots which could lead to local boiling and to sheath failure. A description of such fuel assemblies may be found in numerous reference, for instance European No. 54,236 (Westinghouse) and U.S. Pat. No. 4,059,483 (Anthony).

The grids required for fulfilling all these functions impress on the flow of the coolant in the assembly a pressure drop which should be reduced as much as possible. But, concurrently, research work carried out for further increasing the thermal performances of nuclear reactors have led to increasing the coolant flow rate and, therefore, the forces exerted by the coolant on the components of the assemblies. The problem becomes more acute in spectral shift reactors since part of the cross-section should be reserved for guide tubes associated with water displacer rods and the lattice pitch should be decreased for locating the same amount of fissile material in the fuel assembly. As a result, the cross-sectional area available for coolant flow is reduced, which causes an increased pressure drop and a reduction of the protection margin before nucleated boiling in the top part (i.e., the downstream part) of the assemblies.

SUMMARY OF THE INVENTION

It is an object of the invention to provide a fuel assembly of the above-defined type having, compared with a conventional assembly, a reduced pressure drop while having a comparable mechanical strength. To this end, there is provided a fuel assembly in which the grids are of several different types and may be considered as comprising median grids, designed for withstanding the lateral shocks, and having fins for creating turbulences in the coolant flow along the assembly, bottom grids without fins and providing cross bracing of the elements, and top grids with fins and ensuring cross bracing of the elements, the top and bottom grids imposing on the coolant a lower pressure drop than the median grids.

This arrangement considerably reduces the total pressure drop for a given flow rate since the median grids alone, which must have a high rigidity, impose a pressure drop comparable to that of the grids conventionally used in prior fuel assemblies (slightly smaller, however, if the usual fuel element supporting springs are omitted), while the top and bottom grids may impress a pressure loss much smaller than the median grids.

In practice, the median grids will generally have a height greater than that of the top and bottom grids, and each will of a median grid cell will have two bosses for bearing on the corresponding fuel element, said bosses being offset in the flow direction. The top and bottom grids may have a single boss per wall.

For increasing the rigidity of the median grids, they may be extended upstream (i.e., towards the bottom) by tongues having a bend in the longitudinal direction and playing the role of stiffener.

Fuel assemblies have already been proposed in which the fuel elements are supported axially by the two end grids only, situated close to top and bottom end pieces (French No. 2,496,316). The two end grids may be made from a material different from the others, having a higher neutron absorption (for example, the "INCONEL" nickel-chrome base alloy) instead of a zirconium based alloy, because they are in end zones of the core. The purpose, however, is then only to improve the neutron balance by removing as much as possible materials having a considerable neutron absorption cross-section from the core. A comparable result may be attained, in a fuel assembly according to the invention, by providing an additional grid for supporting the elements above the top holding grids mentioned above and made from low neutron absorption material.

Due to the reduction in the pressure drop imposed to the flow across each grid, the total number of grids may be increased in the fuel assembly; in addition, it will often be of advantage to space these grids not at equal intervals, but at progressively decreasing intervals in the direction of flow, so as to increase the turbulences in the downstream part and consequently to counter nucleate boiling.

BRIEF DESCRIPTION OF THE DRAWINGS

The invention will be better understood from the following description of a particular embodiment given by way of example.

DETAILED DESCRIPTION OF A PREFERRED EMBODIMENT

Figure 1:
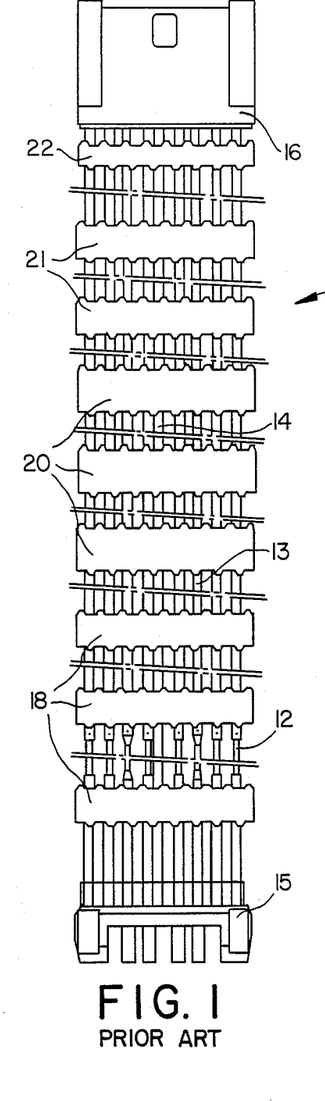
FIG. 1 is a schematic view in elevation of the skeleton or structure of a fuel assembly to which the invention may be applied.
Figure 1A:
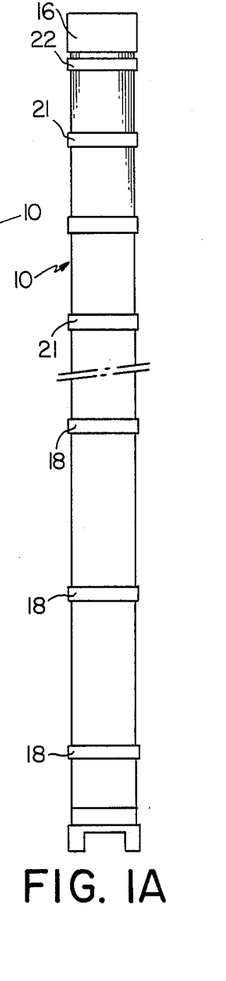
FIG. 1a is a schematic representation of the skeleton illustrating the different distances between adjacent grids.

Referring to FIG. 1, a fuel assembly suitable for use in a spectral shift pressurized light water reactor is diagrammatically illustrated, of the tube also described, for example, in French No. 2,496,320 (Westinghouse) or French No. 2,535,502 (FRAMATOME et Cie) to which reference may be made. The fuel assembly 10 comprises fissile fuel elements (not shown) disposed at the nodes of a square mesh lattice. Guide tubes are located at a plurality of nodes of the lattice and are also distributed regularly. The guide tubes are of two different types. Guide tubes 12 form the framework of the assembly and are joined to end pieces and to grids, whereas other guide tubes 13 are not connected mechanically to the end pieces and are slidably received in cells of the grids. Some of the guide tubes are for guiding control elements (i.e., "black" or "grey" rods) containing neutron absorbing material and for controlling the reactivity. Other ones of the guide tubes are provided for guiding elongate elements for adjusting the moderation ratio, these will typically be elements containing fertile material and/or provided for driving out the water contained in guide tubes. In the center of the fuel element lattice an instrumentation tube 14 may be provided.

The skeleton of the assembly comprises, in addition to the tubes, a lower end piece 15, an upper end piece 16 and a series of grids which will now be described. These grids, fixed to some at least of the guide tubes, may be divided into four categories, which will be successively described and which will be designated by the names of "bottom grids 18", "median grids 20", "top grids 21" and "endmost support grid 22".

Grids 18, 20, 21 and 22 are formed by two sets of cross braced plates assembled together by lap jointing and defining cells. In general, grids 18, 20, 21 and 22 will be formed from a zirconium based alloy with low capture cross section, often an alloy called "ZIRCALOY". However, grid 22, which has a supporting function, may be formed from an alloy having better mechanical characteristics, for example an "INCONEL".

Figure 2:
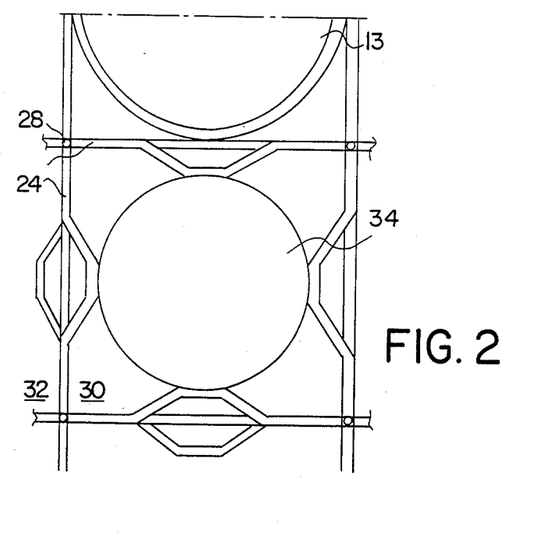
FIG. 2 is a schematic plan view on an enlarged scale showing the intersecting arrangement of grid plates defining a cell.

FIG. 2 shows the appearance, in plan view, of girds 18, 20 and 21. These grids comprise two sets of plates 24 in which are formed with slits 26 (FIG. 3) for mutual interengagement of the plates. Once fitted together, the plates are welded at points 28, for example by an electron beam. Plates 24 are pressed so as to create bosses projecting from each side of the plate, into two adjacent cells, such as cells 30 and 32 in FIG. 2. These bosses provide a cross bracing of the fissile material elements, such as element 34 shown in FIG. 2.

Grids 18 (FIGS. 3 and 4) comprise, on each face of a cell, a single boss. The bosses corresponding to cell 30 are designated by the reference 36 of FIGS. 3 and 4. The bosses on two opposed faces are at a different level from that of the bosses carried by the two perpendicular faces. Each fissile material element 34 is therefore cross braced by contact with four bosses. With each boss 36 is associated a boss 38 orientated in the opposite direction, except in the case of the walls which define a cell occupied by a guide tube 13 (FIG. 2). Grids 18 are not provided with fins. They participate therefore only to a small extent in mixing the fluid streams and consequently, cause only a very small pressure drop. This absence of mixing does not represent an appreciable disadvantage for, in the zone where they are situated, the coolant is till far from the maximum temperature which it will reach at the outlet of the assembly. Grids 18 essentially provide cross bracing of the elements, which result may be obtained with a relatively low longitudinal of the grids and without bulky fissile element support bosses.

Grids 18 may be connected to the guide tubes 12 by lugs extending the plates and welded to the guide tubes. Grids 18 may easy fit in the cells concerned, or held in contact with the guide tubes 13 by projections formed on the plates by deformation.

Figure 5:
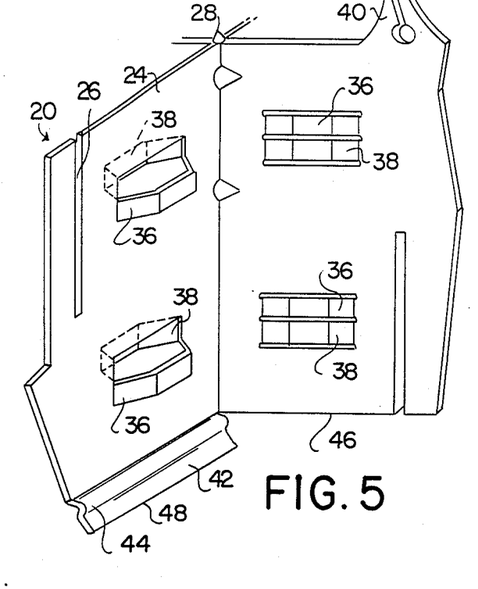
FIGS. 5 and 6, similar to FIGS. 3 and 4, illustrate a median grid.
Figure 6:
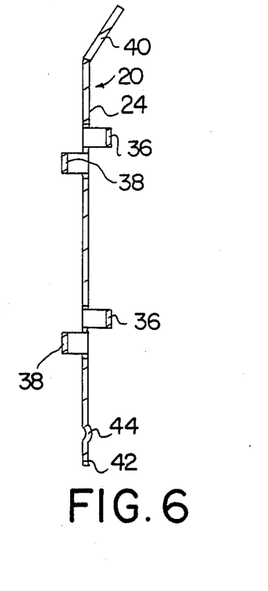

The median grids 20 may have the general construction shown in FIGS. 5 and 6. These grids fulfill practically simply be positioned with an used in conventional fuel assemblies except the axial support of the elements, since the grid shown in FIGS. 5 and 6 is without resilient holding springs.

A first function of grids 20 is to protect the fissile material element bundle against lateral shocks which assembly 10 may undergo. These grids 20 must in particular withstand, without transverse crushing shocks of seismic origin or accidental during operation or handling. Grids 20 must have a thickness and a height such that there cannot be a deformation of the grid narrowing the hydraulic passages to such an extend that the temperature of the sheath of the elements reaches a dangerous value. There must be no deformation either of the guide tubes or of their lattice hindering the movement of the elements belonging to the clusters.

For this reason, the plates 24 of grids 20 will generally be thicker and wider than the plates of grids 18.

The second function of grids 20 is to introduce turbulences into the flow of the cooling fluid flowing upwardly through the cells such as 30. For that purpose, the plates may be provided with slanting fins 40, of the type described, for example, in French patent application No. FR 84 16803.

For further increasing the rigidity of the grid, some at least of the plates are advantageously extended by a lip 42 having at least one longitudinal stiffening bend 44. Lips 42 have the further advantage of providing a leading edge at two distinct levels 46 and 48.

Grids 20 further fulfill a function of cross bracing the elements, provided by bosses 36, 38 placed on each face at two levels, and not at a single level as in the case of grids 18.

Figure 7:
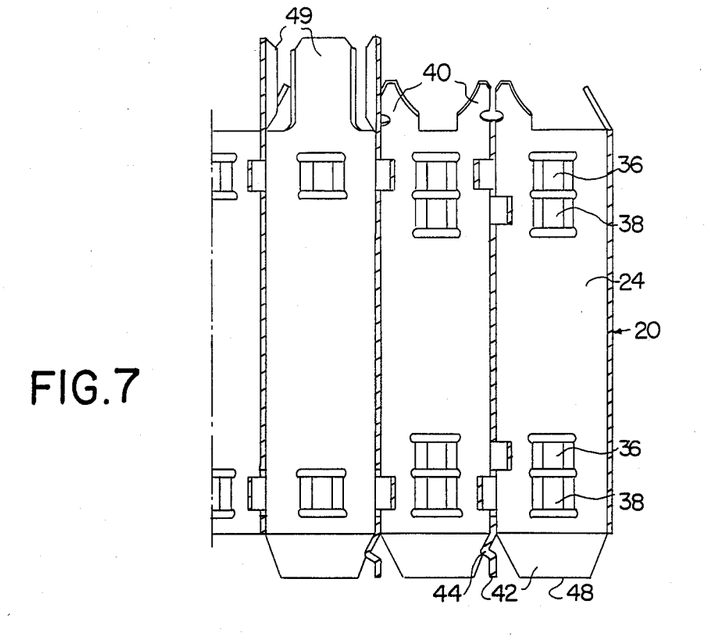
FIG. 7 is an elevational view showing, more realistically than in FIGS. 5 and 6, a possible form of the plates forming a median grid, in section through a vertical plane parallel to a plate.
Figure 8:
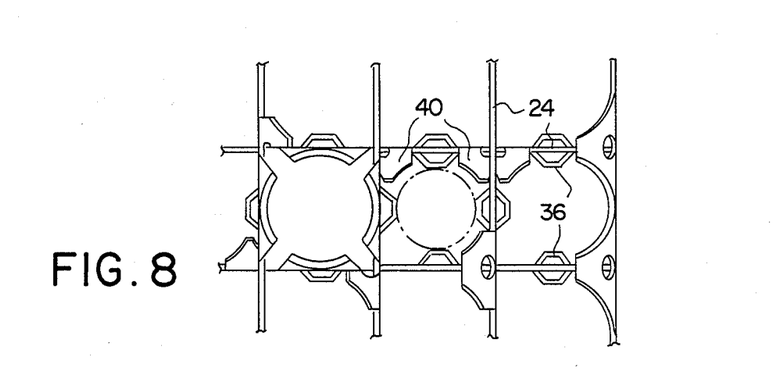
FIG. 8 is a plan view of a fragment of FIG. 7.

FIGS. 7 and 8 show on possible construction of grids 20 and show fixing tongues 49 on some of the guide tubes.

Figure 3:
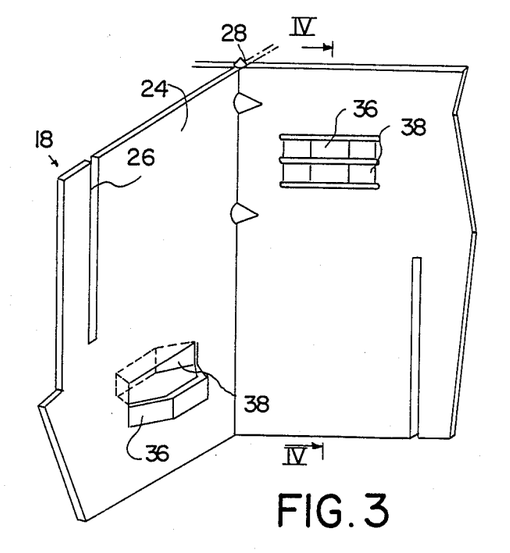
FIG. 3 is a perspective diagrammatic view, not to scale showing bosses formed on two of the walls of a bottom grid of the assembly of FIG. 1.
Figure 4:
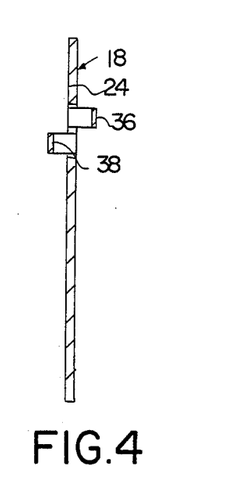
FIG. 4 is a sectional view along line IV—IV of FIG. 3.
Figure 9:
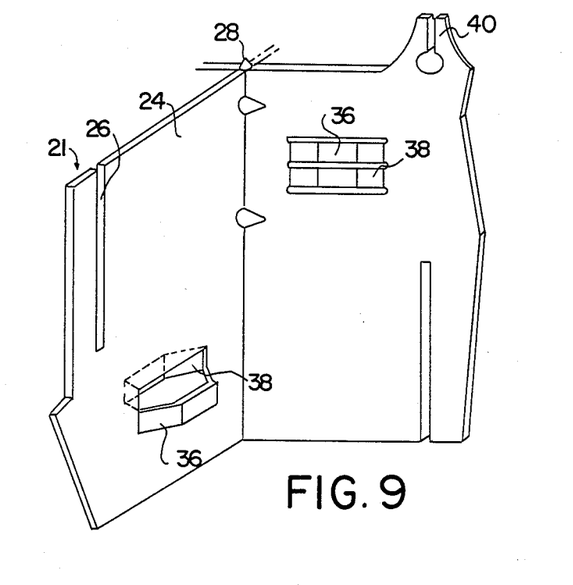
FIG. 9 similar to FIG. 3, corresponds to a top grid of the assembly of FIG. 1.

Finally, the top grids 21 provide the same cross bracing function as grids 18 and further provide the function of mixing the fluid streams required in the part of the assembly where the coolant fluid is at maximum temperature. FIG. 9 (where the parts corresponding to those of FIG. 3 are designated by the same reference numbers) shows that the plates are provided with fins 40 which may have the same construction as those of grids 20.

It can be seen that grids 21, placed at a critical position from the point of view of nucleated boiling or DNB fulfil two functions reduction of the pressure losses and homogeneization of the coolant.

Figures will now be given, by way of example, for the dimensions which grids 18, 20 and 21 may have.

Grids 18 may be formed from plates 24 made from a zirconium based alloy called "ZIRCALOY" having a height between 20 and 40 mm, advantageously 34 mm, and a thickness between 0.2 and 0.5 mm. Grids 20 may then be formed from "ZIRCALOY" plates having a height between 40 and 70 mm (advantageously 63 mm) and a thickness between 0.3 and 0.6 mm (advantageously 0.4 mm). Grids 21 have the same dimensions as grids 18 and only differ therefrom by the addition of fins.

If, under these conditions, the pressure drop coefficient of a conventional type grid, comprising springs for holding the elements in position, is equal to 1, the pressure drop coefficients of grids 18, 20, 21 will be, respectively, about 0.5; 0.9; and 0.7.

If assembly 10 comprises then three grids 18, three grids 20 and two grids 21, the total pressure drop is 5.6, instead of 8 for eight conventional grids. The gain is about 30%.

Thus, for an equal pressure drop, the invention allows the number of grids to be increased for homogeneizing the coolant flow over the height of the bundle. This increase also allows variable spacing to be given to the grids and, in particular, the homogeneization to be reinforced in the downstream part of the bundle, with closely spaced grids 21.

In addition, the increase in the number of grids improves the geometrical stability of the assembly and limits the buckling phenomena under irradiation of the elements containing the fissile material.

Although the use of bosses 36 and 38 for retaining the elements represents a substantial advantage from the point of view of pressure loss reduction, the invention may also be used while retaining on some of the grids at least, undulations formed by cutting and pressing the plate.

The assembly 10 shown in FIG. 1 further comprises an endmost grid 22 placed immediately under the upper endmost piece 16. This position in a region of the core where the neutron flow is reduced means that grid 22 may be made from a material having a greater neutron absorption cross section than that of "ZIRCALOY" and may be chosen for its mechanical strength qualities. In this case, grid 22 may be formed for example from a ferrous alloy or an Ni—Cr alloy such as "INCONEL".

The sole function of grid 22 is to hold the fissile material elements 34 in position axially. It does not therefore comprise any fins and its components may be designed for minimizing the pressure losses.

Figure 10:
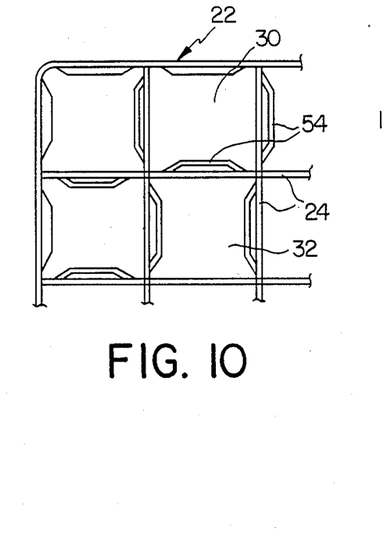
FIG. 10 is a plan view of a fragment of an endmost top grid usable in an assembly as shown in FIG. 1.
Figure 11:
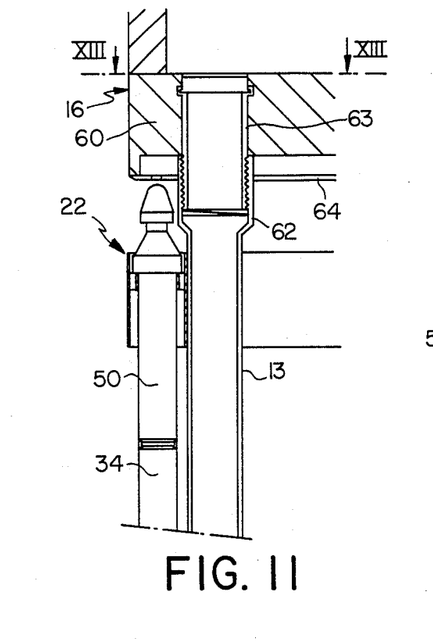
FIG. 11 is a sectional view along a vertical plane showing a fragment of the top part of the assembly of FIG. 1, and in particular the cooperation of a guide tube, of the upper end piece and of the endmost axial supporting grid.
Figure 12:
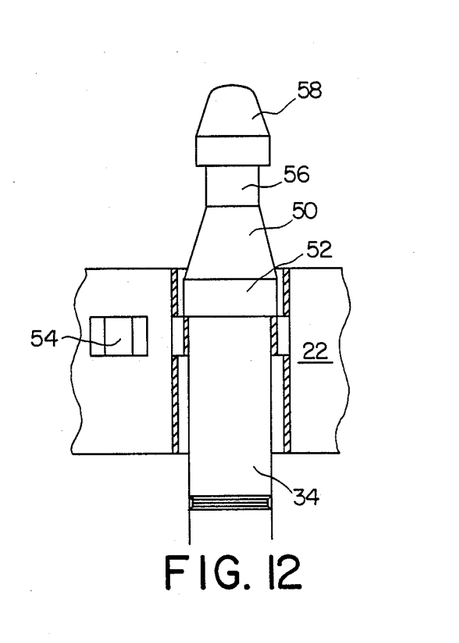
FIG. 12 is a diagrammatic view on an enlarged scale corresponding to the zone in the dot-dash frame in FIG. 11, showing how an element is supported by the endmost grid.

FIGS. 10 to 12 show a possible construction of grid 22. The plates 24 of grid 22 define cells in which the fissile material elements 34 are inserted. Each element is provided with a plug 50 having a collar 52 defining a lower annular shoulder. In plates 24 of grid 22 are formed, by cutting and pressing, bosses 54 of a depth such that they come into contact with the shoulder of collar 52 and retain the element. The external diameter of the shoulder is, for example, 10.5 mm, whereas the diameter of the element in its current part is 9.5 mm and the bosses 54 are shaped to engage the element. The plug further comprises, above collar 52, a shank 56 and a conventional nose cone 58, intended for gripping the element.

Figure 13:
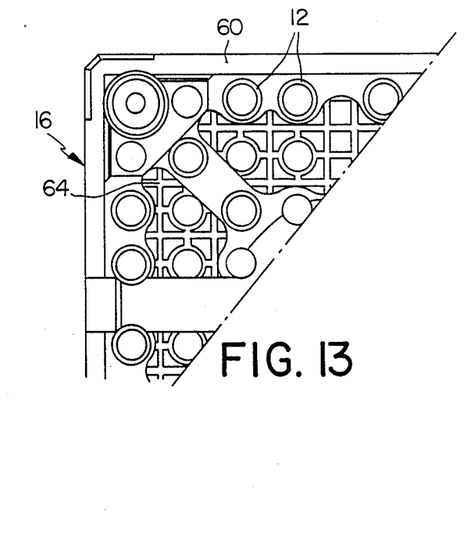
FIG. 13 is a plan view showing a top end piece for use in the fuel assembly of FIG. 11.

FIG. 11 also shows a fraction of the upper endpiece 16 of assembly 10, placed in the vicinity of grid 22. Piece 16, also shown in FIG. 13, is formed of a plate 60 having wide openings for the passage of the coolant fluid. The guide tubes 12 and 13 belonging to the skeleton of the assembly are fixed to plate 60, by a screwed connection, for example. Grid 22 is welded directly to tubes 12 if the materials which form these two elements are compatible, for example if grid 22 and tubes 12 are made from a zirconium based alloy. When, on the other hand, gird 22 is made from stainless steel, an intermediate sleeve of stainless steel will be placed between the tube and the grid. FIG. 11 shows in a very schematic way one possible method of fixing, using a threaded sleeve 62 and a socket 63.

As a general rule, only some of the guide tubes 12 and 13 will be connected to plate 60, thereby increasing the permeability of this plate and reducing the pressure losses imposed on the coolant by the upper end piece.

In an assembly which may be considered as representative, having two hundred and sixty seven fissile material elements disposed in a square mesh lattice 18×18, sixteen guide tubes for guiding the control elements and forty guide tubes for guiding the fertile elements, about thirty of the guide tubes 13 are not fixed to plate 60.

The upper end piece 16 carries, under plate 60, a plate 64 formed with a checker work aperture pattern whose nodes coincide with the axes of elements 34. Plate 64 is intended to limit the upward movement of elements 34. This plate 64 is welded to plate 60.

It can be seen that, once in position, elements 34 are supported by grid 22 and their upward movement is limited by plate 64. Consequently, they can only expand axially, particularly under irradiation, toward the bottom of the assembly.

Figure 14:
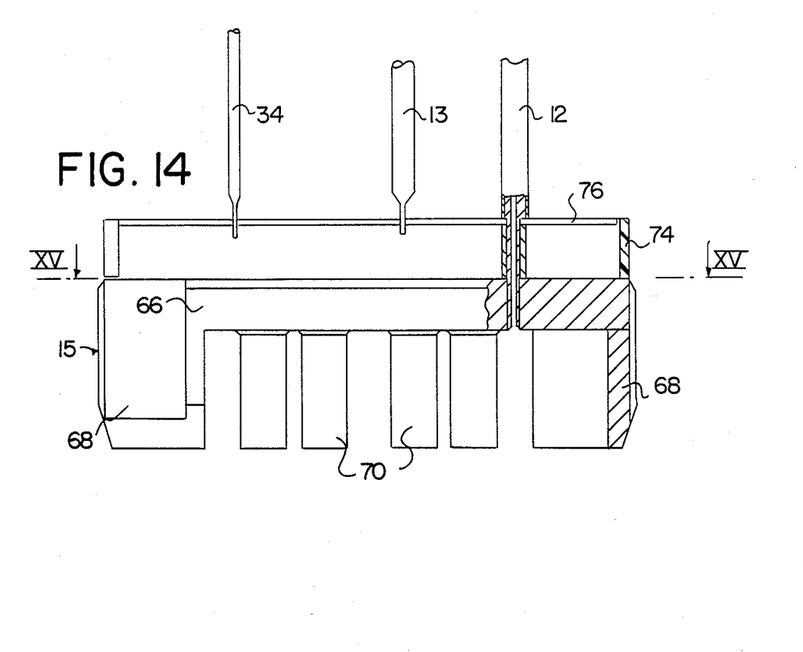
FIG. 14 is an elevational view partially in section, showing an embodiment of the bottom end piece of the assembly of FIG. 1.
Figure 15:
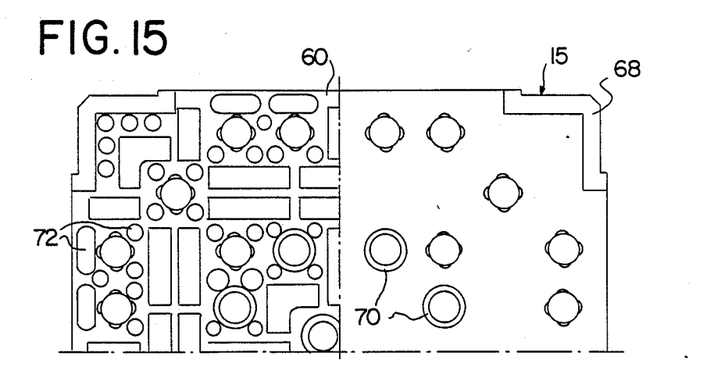
FIG. 15 is a plan view of the bottom end piece shown in FIG. 14, in section along the XV—XV of FIG. 4.

The lower end piece 15 may have the construction shown schematically in FIGS. 14 and 15. This piece comprises (contrary to the lower end pieces of conventional fuel assemblies) a single supporting and fluid distributing plate 66. This plate may be formed by molding. It does not have the role of limiting the downward movement of elements 34, since this role is filled by grid 22.

To plate 66 are fixed chamfered skirts 68 which extend it downwardly and facilitate engagement of the assembly on guides (not shown) during insertion thereof into the core of the reactor. Tubular cross braces 70 fixed to the lower face of plate 66 rigidify piece 15 in which are formed holes 72 for the passage of the coolant.

A skirt 74 is welded to the upper face of piece 68 and forms the fixing frame for a grating 76 which defines cells for receiving the lower plugs of the fissile material elements 34 and end parts of those of the guide tubes 13 which do not belong to the skeleton of the assembly.

This arrangement has several advantages. It reduces the pressure loss because the coolant passages have an increased cross-section area. It allows the axial growth of elements 34 and guide tubes 13 under irradiation.

Grating 76 may be provided so as to hold the end of elements 34 and guide tubes 13 efficiently in position by clamping and so as to prevent the entering cooling jets of coolant from vibrating the elements and the tubes.

It should be noted that the assembly may thus dispense with the element stopping plate generally provided in the assemblies of the prior art, which reduces the pressure losses. It should also be noted that the downward enlargement under irradiation of those of the guide tubes 13 which do not belong to the skeleton, coming simply into abutment against plate 60 is possible.

The guide tubes 12 which belong to the skeleton may be fixed to plate 66 in a conventional way by a threaded connection.

Figures 16, 17:
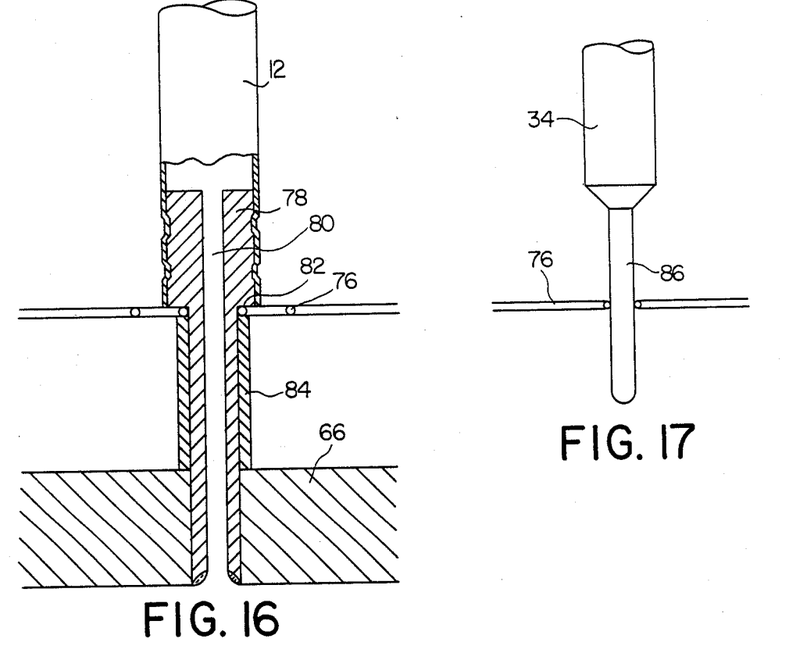
FIG. 16 is a detail view showing a modification of the connection between a guide tube and the bottom end piece of the assembly.
FIG. 17 shows how a fuel element may be guided in the bottom end piece, at the level of line XVII—XVII of FIG. 18.

In the modification shown in FIG. 16, guide tube 12 is fixed by a stainless steel or INCNEL plug 78, pierced by a central bore 80 for passage of the coolant. The guide tube 12 is connected by mechanical deformation, obtained for example by rolling, to the top enlarged portion of plug 78. This enlarged portion ends in a shoulder 82 bearing on grating 76. The low part, of small diameter, of plug 78 passes through plate 66 to which it is welded. A spacer 84 surrounding the low part of the plug reinforces the strength of grating 76.

Figure 18:
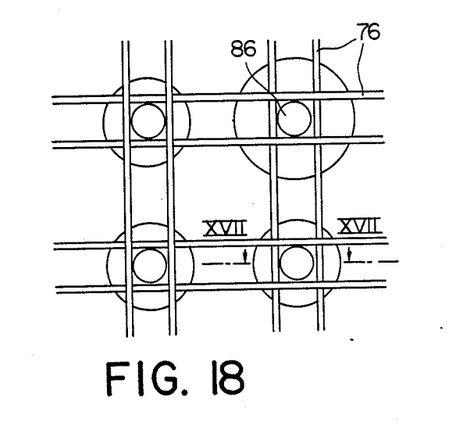
FIG. 18 is a bottom view of FIG. 17.

FIGS. 17 and 18 show schematically one possible method of guiding elements 34 in the grid 76 of the lower end piece. The plug of the element comprises an extension 86 of a diameter such that it is guided in a mesh of grating 76. Such guiding allows the element to withstand the coolant jets leaving the plate of the lower end piece and avoids any excessive or untimely movement of element 34. But at the same time, this guiding method leaves the element free to expand under irradiation.

By way of example, the following dimensions may be mentioned for grating 76 and the element: grating 76 is formed by crossed sound wires of "INCONEL" having a diameter of about 1.5mm, welded at their intersections. These wires are also welded to the frame formed by skirts 74. Extension 86 may have a diameter of 4mm, corresponding to the mesh dimension of grating 76.

Figure 19:
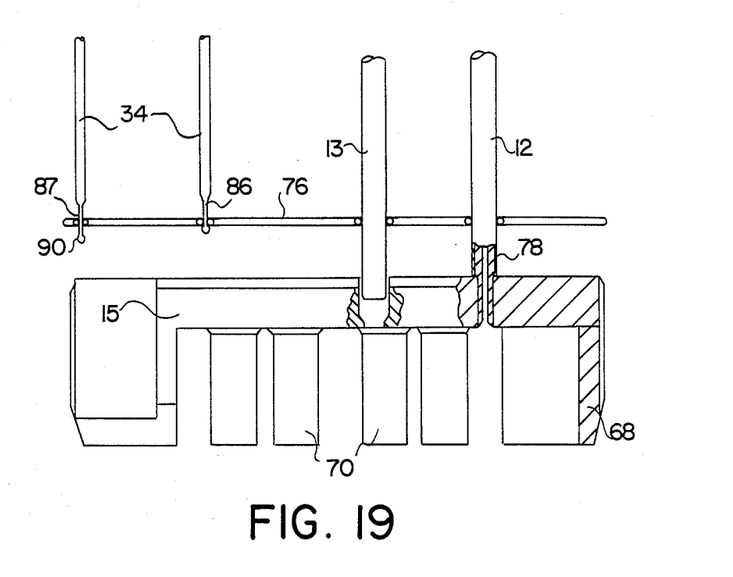
FIG. 19, similar to FIG. 14, shows a modified construction.

In the variant of the invention shown in FIG. 19, grating 76 is free instead of being fixed to the lower end piece by a skirt as in the case of FIG. 14. This solution reduces the amount of bending of the assembly due to the differential shortening of the guide tubes 12 and of elements 34 when the temperature of the reactor returns from the operating temperature to the temperature after shutdown. For retaining grating 76, those of elements 34 which are placed at the periphery of the bundles may have an extension 87 longer than the extensions 86 of the central elements and may be provided with an end retaining swelling 90. Similar swellings may be provided on the extensions 86.

The amount of bending of the assembly is reduced due to the considerable friction exerted by grating 76 on the plugs of the elements, such friction is required since the grating must exert, on extensions 86 and 87, a clamping force sufficient to prevent the elements from being vibrated under the action of the coolant jets. Such friction of the elements and grating 76 is very much greater than that in grids 18, 20, 21 and 22. On the other hand, the guide tubes, whether they belong to the skeleton or whether they are slidably mounted, are able to slide freely in grating 76.

Because of the additional length given to extensions 86, the differential lengthening possibly occurring between the elements 34 of the same assembly without there being jamming is increased.

I claim:

1. A fuel assembly for a nuclear reactor comprising a top end piece, a bottom end piece, a plurality of elongate elements extending between and interconnecting said top end piece and bottom end piece, a bundle of parallel fuel elements located between said top and bottom end pieces, and a plurality of grids spaced apart along said elongate elements and forming cells for retaining said fuel elements at the nodes of a regular lattice, said grids including a plurality of top grids, a plurality of bottom grids and a plurality of median grids, wherein:

said median grids are constructed and arranged to withstand lateral shocks and provided with turbulence creating fins, said bottom grids are all located between said median grids and bottom end piece, are devoid of fins and are arranged for cross-bracing said fuel elements, and said top grids are all located between said median grids and top end piece, are provided with turbulence creating fins and are arranged for cross-bracing said fuel elements, each of said bottom and top grids being constructed to impress to a coolant flow along and within said fuel assembly a head loss smaller than any one of said median grids.

2. The fuel assembly as claimed in claim 1, wherein each said median grid has a height greater than that of the top and bottom grids and comprises cell defining walls and wherein each of said walls is formed with bosses contacting said fuel elements, each of said walls being provided with two bosses offset in the longitudinal direction of the fuel element received in the cell, said bosses being the only fuel element contacting means in said median grids.

3. The assembly as claimed in claim 1, wherein each of said median grids is provided with tongues projecting upstream with respect to the direction of coolant flow, each formed with a stiffening rib transverse to the direction of coolant flow.

4. The assembly as claimed in claim 1, wherein the grids are spaced apart at progressively decreasing intervals in the flow direction.

5. The assembly as claimed in claim 1, further comprising an additional grid devoid of fins, located between said top grids and said top end piece and of a material having a greater neutron absorption than said top, bottom and median grids.

6. The assembly as claimed in claim 5, wherein said additional grid is secured to some at least of said elongate elements and is provided with bosses for supporting shoulders formed on plugs of the fuel elements and the upper end piece is provided with means limiting the upward movement of the elements so that these latter can only extend downwardly by sliding in the other grids.

7. The assembly as claimed in claim 6, wherein said top end piece comprises a first plate having wide openings for passage of the coolant, fixed to said elongate elements and a second plate fastened to said first plate and formed by a checker board pattern having nodes coinciding with the axis of the fuel elements, and forming means for limiting the movement of these latter.

8. The assembly as claimed in claim 7, wherein said elongate elements consist of only some of a plurality of guide tubes and constitute a framework for said fuel assembly with said bottom end piece and a top end piece.

9. The assembly as claimed in claim 1, further comprising a grating located immediately above the lower of said bottom end pieces, said grating being arranged for guiding extensions of plugs of the elements.

10. The assembly as claimed in claim 9, wherein the grating is fixed at its periphery to a skirt belonging to the bottom end piece.

11. The assembly as claimed in claim 9, wherein said extensions of plugs of the fuel elements have a sliding fit in said grating, some at least of said plugs being formed, at their end, with a bulge for retaining the grating.

12. A fuel assembly for a nuclear reactor comprising a top end piece, a bottom end piece, a plurality of elongate elements extending between and interconnecting said top end piece and bottom end piece, a bundle of parallel fuel elements located between said top and bottom end pieces, and a plurality of grids spaced apart along said elongate elements and forming cells for retaining said fuel elements at the nodes of a regular lattice, said grids including top grids, bottom grids and median grids, wherein:
  said median grids are constructed and arranged to withstand lateral shocks and provided with turbulence creating fins,
  said bottom grids are devoid of fins and are arranged for cross-bracing said fuel elements,
  said top grids are provided with turbulence creating fins and are arranged for cross-bracing said fuel elements,
  each of said bottom and top grids being constructed to impress to a coolant flow along and within said fuel assembly a head loss smaller than any one of said median grids,
  wherein said top end piece comprises a first plate having wide openings for passage of the coolant, fixed to said elongate elements and a second plate fastened to said first plate and formed with a checker board pattern having nodes coinciding with the axis of the fuel elements and forming means for limiting longitudinal movement of the latter.

* * * * *